Sept. 17, 1935.  C. F. TEICHMANN  2,014,915
TREATING HYDROCARBON OILS
Filed Oct. 3, 1932
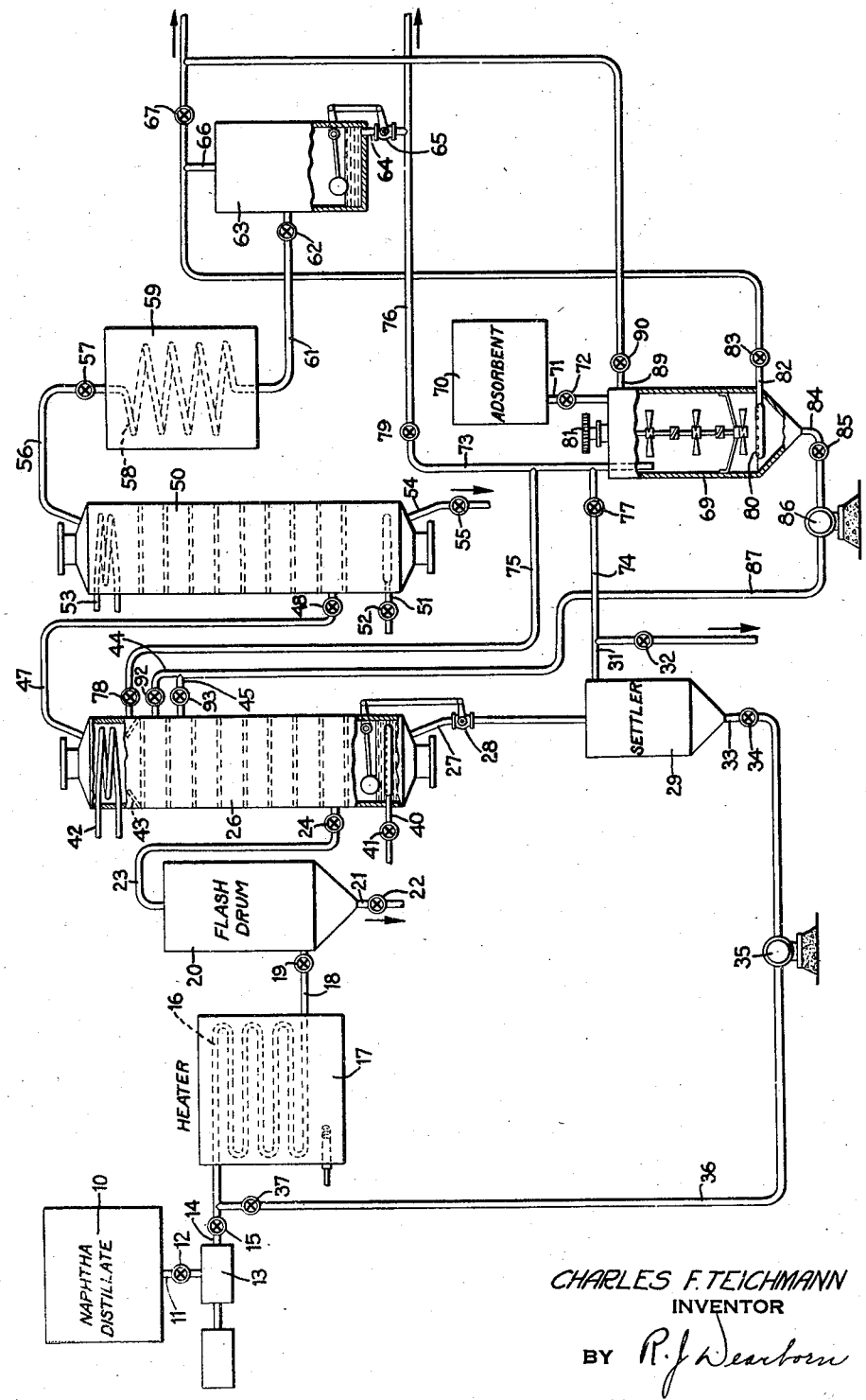
CHARLES F. TEICHMANN
INVENTOR
BY R. J. Dearborn
HIS ATTORNEY

UNITED STATES PATENT OFFICE 2,014,915

TREATING HYDROCARBON OILS

Charles F. Teichmann, New York, N. Y., assignor to The Texas Company, New York, N. Y., a corporation of Delaware Application October 3, 1932, Serial No. 635,945

5 Claims. (Cl. 196—79)

This invention relates to the treatment of hydrocarbon oils and more particularly to the treatment of distillates obtained by cracking petroleum or other hydrocarbons which may contain unstable, unsaturated compounds.

The invention contemplates a method of treating and purifying hydrocarbon oils such as cracked naphtha, containing undesirable, unsaturated compounds, which includes contacting the naphtha under substantially liquid phase conditions and at elevated temperature under superatmospheric pressure, with a suitable contact catalyst whereby a portion of the undesirable, unsaturated compounds are polymerized to compounds of higher boiling point, distilling the treated naphtha and contacting naphtha vapors with a suitable contact catalyst whereby any remaining undesirable, unsaturated compounds are polymerized. A product is thus obtained which is especially stable as to gum content and color.

When hydrocarbons such as cracked naphtha and the like, containing certain types of unstable and undesirable, unsaturated compounds, for example, the diolefines, are contacted at elevated temperatures and in the liquid state with catalytic adsorbents which are active at such temperatures, a polymerization of the unstable, unsaturated compounds takes place. Such a polymerization results in the formation of new compounds known as polymers having boiling points higher than those of the original unsaturated compounds. This characteristic of the polymers permits of their ready separation from the treated naphtha by means of a distillation of the liquid treated product in which they are present.

Such liquid phase methods of treating cracked naphtha may be satisfactory for the treatment of most types of naphtha distillates. However, in the case of some of the more highly unsaturated distillates produced by certain cracking conditions, the products of a liquid treatment may be unstable when exposed to oxidation or to long storage. This instability may be due either to the presence of small quantities of undesirable, unsaturated compounds remaining in the oil or to partly polymerized compounds which have been formed during the liquid phase treatment.

It is appreciated that by subjecting hydrocarbons containing unstable, unsaturated compounds to a treatment in the vapor phase with certain catalytic adsorbents, that a very complete separation of these unstable materials is possible without in any way affecting those unsaturated compounds which, by their presence enhance the anti-detonating qualities of the product. However, in the case of cracked naphthas containing large percentages of unsaturated compounds the vapor phase treatment may be uneconomical because of the large quantities of polymers which may be formed, quickly filling up the pores of the catalytic adsorbent material and rendering it useless until subjected to revivification.

In accordance with my invention, the advantages of treating cracked naphtha both in the liquid and in the vapor phase are obtained yielding results not obtainable by the employment of either method alone. The liquid phase treatment serves as a vigorous means of removing the bulk of the unstable, unsaturated compounds. Because of the higher pressures and higher temperatures employed in this treatment the actual polymerization per unit weight of catalyst employed is high and the polymers which are formed are continuously and concurrently washed out of the adsorbent by the associated portions of the naphtha. The vapor phase treatment which may be carried out at a somewhat lower pressure and temperature serves effectively to polymerize and separate any undesirable, unsaturated constituents which may not have been removed or which may have been formed during the liquid phase treatment.

Thus, by the practice of the present invention, cracked naphthas, derived from any type of cracking process, and including those naphthas which are particularly refractory to ordinary treating methods, can be purified and stabilized to yield motor fuel of a most satisfactory merchantable quality.

A particular advantage of the invention lies in the fact that each of the two processes of treating may be worked at their highest efficiency without decreasing substantially the lives of the adsorbents.

The invention will be fully understood from the following description taken in connection with the drawing which represents in diagrammatic sectional elevation, an apparatus which may be employed for carrying out the process. The apparatus illustrated in the drawing is shown and described merely for the purpose of aiding and understanding the process and it is to be understood that any other suitable apparatus may be substituted for that shown.

In the drawing, the numeral 10 designates a storage for a supply of cracked naphtha distillate which is to undergo treatment. This storage is connected through the line 11 controlled by the valve 12 with the inlet of the charge pump 13. This pump is connected through the line 14 and the valve 15 with the coils 16 of a suitable heater 17 which may be of any of the conventional types. The outlet of the heater coils is connected to the line 18, controlled by the valve 19, which enters the flash chamber 20.

The bottom of the flash chamber 20 is provided with a draw-off line 21 controlled by the valve 22. The top of the chamber is fitted with a line 23 controlled by the expansion valve 24, which line enters the fractionating and treating tower 26 at a lower point in the structure.

The fractionating tower 26 may be of the conventional type so constructed as to withstand the pressures to which it may be subjected. It is fitted at its lowest point with a draw-off line 27 controlled by the automatic valve 28 which connects with the settling chamber 29. This settling chamber, which may with advantage be fitted with a conical bottom, is supplied with a liquid draw-off line 31 controlled by the valve 32 which leaves the structure at an upper point. The bottom of the settler is fitted with a line 33 controlled by the valve 34 which connects it with the inlet of the pump 35. This pump discharges through the line 36 controlled by the valve 37 into the line 14.

The fractionating tower 26 is fitted at a lower point of its structure with a steam spray 40 which is controlled by the valve 41. At an upper point of the fractionating tower there is situated the cooling coil 42 the purpose of which is to supply reflux cooling for the fractionation. Immediately below the reflux cooling coil 42 there is fitted a trap tray 43 for facilitating the withdrawal of a certain portion of the reflux liquid.

At points intermediate the top and bottom of the tower 26 there are introduced the lines 44 and 45 controlled respectively by the valves 92 and 93, which serve a function which will be hereinafter described.

The uppermost point of the fractionating tower 26 communicates through the vapor line 47 controlled by the valve 48 with a lower point of the fractionating tower 50. This fractionating tower is fitted at a point near the bottom with a steam spray 51 controlled by the valve 52 and at an upper point with the cooling coil 53 for supplying reflux. The bottom of the tower 50 is supplied with a draw-off line 54 controlled by the valve 55 which leads to a suitable storage. The uppermost point of the tower is provided with a vapor draw-off line 56 fitted with a valve 57 which connects it with the coils 58 of the condenser 59. The outlet of this condenser communicates with the line 61 fitted with the valve 62 which line enters the separatory chamber 63. The bottom of this separatory chamber is provided with a liquid draw-off line 64 controlled by the valve 65, which line communicates with a suitable storage tank (not shown) for the liquid product. The top of the separatory chamber is supplied with a vapor draw-off line 66 controlled by the valve 67 which line connects the vapor space of the separator with a gas compression plant or a suitable gas storage.

The lines 44 and 45 which enter the fractionating and treating tower 26 at various levels are used for introducing into the tower a suspension of a catalytic adsorbent in a hydrocarbon oil. This slurry is prepared in the mixing chamber 69. Adsorbent catalyst which is stored in the storage tank 70 is introduced into the mixing chamber through the line 71, controlled by the valve 72. Suitable hydrocarbons for preparing the catalytic adsorbent suspension are introduced into the mixing chamber through the supply line 73. To this supply line there are manifolded the lines 74, 75 and 76. These lines respectively connect with the line 31, the trap tray 43 and the discharge line 64 which leaves the separatory chamber 63. Each of these lines is fitted with a control valve. These valves are respectively designated by the numerals 77, 78 and 79.

In order to bring about effective suspension of the catalyst adsorbent in hydrocarbon oil, a gas spray 80 and the mechanical agitator 81 are provided. The gas spray is connected through the line 82 controlled by the valve 83 with the vapor outlet of the separatory chamber 63.

The bottom of the mixing chamber is provided with a draw-off line 84 controlled by the valve 85 which is connected to the inlet side of the circulating pump 86. This pump discharges through the line 87 which is manifolded to the lines 44 and 45.

The top of the mixing chamber is fitted with a line 89 controlled by the valve 90, which leads to the vapor line 66 at a point between the valve 67 and the discharge end.

In the operation of the process in connection with an apparatus such as that shown in the drawing, a cracked naphtha distillate which may contain a varying percentage of hydrocarbons suitable for use as motor fuels is drawn from the naphtha storage tank 10 and delivered to the charge pump 13. This pump is of the high pressure type and is capable of delivering oil under pressures of from 1000 to 2000 lbs. per sq. in. or more. Upon leaving the discharge side of this pump, the naphtha is mixed with a varying proportion of a slurry of partly spent catalytic adsorbent in hydrocarbon oil, which slurry is produced in a later stage of the process.

The mixture of naphtha and catalytic adsorbent is delivered to the coils 16 of the heater 17 where its temperature may be raised to a suitable working temperature which may be in the range of from 400 to 700° F. Under the existing pressures, which may be the full working pressure of the charge pump 13, the naphtha is maintained substantially in the liquid phase. During the heating operation which may be prolonged by the use of a multiplicity of heating tubes, the undesirable, unsaturated compounds present in the naphtha distillate are caused to polymerize by the action of the catalytic adsorbent to form higher boiling hydrocarbons or polymers.

Under certain conditions of operation it may be desirable to submit the untreated naphtha distillate to a preliminary stabilizing operation whereby low boiling hydrocarbons and non-condensable gases may be substantially removed. Such compounds, if allowed to remain in the naphtha, tend to become adsorbed by the catalytic adsorbent and, in this manner, tend to reduce the polymerizing activity of the catalyst.

The mixture of heated naphtha, polymers and catalytic adsorbent is delivered from the heater coil outlet through the valve 19 and passes into the flash drum 20. By the proper control of pressure within this flash drum, the hydrocarbons boiling within the distillation range of motor fuels are substantially vaporized while the higher boiling hydrocarbons which include the polymers remain in the liquid state. These liquid hydrocarbons or bottoms, together with the spent catalytic adsorbent, accumulate at the bottom of the flash drum from which they may be drawn off through the discharge line 21 controlled by the valve 22 and passed to suitable storage. The evolved vapors produced in the flash drum are drawn off through the vapor line 23 and the control valve 24 and are introduced into a lower point of the fractionating tower 26. This fractionating tower serves a dual function in that it is not only used for preparing a vapor fraction having definite boiling point limits, but is also used as an apparatus for treating with catalytic adsorbents the hydrocarbons introduced thereinto.

The catalytic adsorbents are introduced into an upper point of the tower in the form of a suspension which may be prepared by admixing with the finely divided adsorbent a quantity of treated hydrocarbons which may or may not have been prepared by this process, or by suspending the adsorbents in an oil having a gravity higher than the desired treated hydrocarbon product, which oil may be produced as one of the by-products of the process, and, for example, may be taken off from the trap tray 43 situated immediately below the reflux coils 42.

So, for example, catalytic adsorbent material stored in the storage chamber 70 may be introduced through the line 71 and the valve 72 into the mixing chamber 69 where it is agitated with oil taken off from the trap tray in an upper point of the fractionating tower 26, with the final treated product withdrawn from the discharge line 64 from the separatory chamber 63 or with a heavier oil obtained from the top of the settling chamber 29. The operations incidental to the production of the last mentioned oil will be described hereinafter.

The formation of the suspension of catalytic adsorbent in hydrocarbon oil is advantageously brought about by agitating the mixture by means of an agitating device such as that indicated by the numeral 81 in the drawing. In certain operations of the process, the contents of the mixing chamber may be efficiently agitated by introducing into the bottom of the chamber 69 hydrocarbon gases such as those produced in the process and which are separated from the final treated condensate which accumulates in the separatory chamber 63. The gases are bubbled upwardly through the mixture of adsorbent catalyst and oil and are drawn off from the top of the chamber through the line 89 which connects with the vapor line connecting the vapor space of the separatory chamber with the gas compression plant or the storage for non-condensable gases.

The suspension of catalytic adsorbent in oil is charged by means of the pump 86 into an upper point of the fractionating tower 26 through the line 87 and either line 44 or 45. The catalytic adsorbent and oil then pass downwardly through the tower whereby the ascending hydrocarbon vapors are brought into intimate contact with the adsorbent.

In the operation of the tower 26, the temperature is maintained sufficiently high to permit of the vaporization of all those hydrocarbons and constituents which are desired in the finished product. Hydrocarbons having higher boiling points are separated and collect at the bottom of the tower in admixture with the partly spent adsorbent. In order to free this mixture of any low boiling hydrocarbons contained therein, it may be desirable to inject steam into the mixture through the steam spray 40.

The mixture of adsorbent and oil which collects at the bottom of the fractionating tower 26 is drawn off through the line 27 controlled by the automatic valve 28 and pass into the settling chamber 29 where the mixture is allowed to settle.

From an upper point of the settling chamber it is possible to withdraw oil which is almost entirely free from adsorbent. This oil may be drawn off through the line 31 controlled by the valve 32 and passes to a suitable storage tank.

A concentration of the partly spent adsorbent takes place at the bottom of the settling chamber and this adsorbent, together with a certain proportion of the oil, may be withdrawn from the bottom of the settler in the form of a thick slurry. This slurry is drawn off at the bottom of the settler through the line 33 controlled by the valve 34 and is delivered to the suction side of the circulating pump 35 by which it is caused to flow through the line 36 controlled by the valve 37 and to enter in the line 14 at a point between the valve 15 and the inlet to the heater coil 16.

The treated vapors which escape from the top of the tower 26 pass through the vapor line 47 and the control valve 48 and enter a lower point of the fractionating tower 50. The purpose of the fractionating tower 50 is to remove all traces of polymers which may have been produced in the treating operation conducted in the tower 26 and which may not have been removed. The vapors introduced into this tower pass upwardly in contact with a descending flow of reflux liquid and in this way there is produced a vapor fraction having the characteristics desired in the final motor fuel. These treated vapors are drawn off from the top of the tower through the vapor line 56 and the valve 57 and are delivered into the coil 58 of the condenser 59 where substantial condensation is brought about.

The pressure maintained within the fractionating tower 50 may vary from atmospheric to a value only slightly less than that maintained in the tower 26.

In those operations where the vapor phase treatment in the tower 26 is carried out under substantial pressures, it may be desirable to carry out the condensation of the treated vapors under pressure. This is most advantageously carried out by proper manipulation of the valve 57 and 62 which control respectively the inlet and outlet of the condenser coil 58 of the condenser 59. The condensate is delivered into the separatory chamber 63 where the pressure may be reduced in order to bring about the separation of non-condensable gases and light hydrocarbons which may have been dissolved in the condensate. These light hydrocarbons and non-condensable gases are drawn off through the line 66 controlled by the valve 67 and may be delivered to a gas compression plant or a storage for non-condensable gases. The liquid hydrocarbons which accumulate at the bottom of the separatory chamber flow through the draw-off line 64 controlled by the automatic valve 65 to a storage tank not shown.

In the operation of the herein disclosed process, it may be desirable to use adsorbent catalysts such as fuller's earth or the like. It may be preferable, however, to use an adsorbent decolorizing clay of the montmorillonite type which has been subjected to a treatment with acid and which exhibits its greatest efficiency at temperatures in excess of 250° F. when used for decolorizing lubricating oils. A material of this type is disclosed in the U. S. Patent No. 1,642,871, issued to Marvin L. Chappell, Richard F. Davis and Merle M. Moore.

Obviously many modifications and variations of the invention, as hereinbefore set forth, may be made without departing from the spirit and scope thereof, and therefore only such limitations should be imposed as are indicated in the appended claims.

I claim:

1. In the production of a color and gum stable motor fuel from a cracked naphtha distillate the steps which comprise heating the naphtha together with a partly spent catalytic adsorbent obtained from a subsequent operation to a temperature of between 400 to 700° F. while maintained substantially in the liquid phase by the use of pressures of from 1000 to 2000 pounds per square inch whereby a portion of the undesirable, unsaturated hydrocarbons is polymerized to higher boiling compounds, flashing the naphtha and fractionating the flashed vapors to produce a partly treated vapor fraction of a definite boiling range, passing this fraction into a treating and rectifying apparatus wherein the vapors are simultaneously fractionated and contacted with a countercurrent flowing suspension of a catalytic adsorbent in a liquid hydrocarbon, maintaining the temperature sufficiently high to maintain in liquid form the hydrocarbons desired in the final product, withdrawing the treated fractionated hydrocarbon vapors and condensing them to yield a color stable motor fuel while simultaneously withdrawing unvaporized higher boiling hydrocarbons and partly spent catalytic adsorbent, separating excess higher boiling hydrocarbons from the adsorbent material and passing the latter to the first step of the process.

2. In the production of a color and gum stable motor fuel from a cracked naphtha distillate the steps which comprise heating the naphtha together with a partly spent acid treated adsorbent decolorizing earth obtained from a subsequent operation to a temperature of from 400 to 700° F. while maintained substantially in the liquid phase by the use of pressures of from 1000 to 2000 pounds per square inch whereby a portion of the undesirable, unsaturated hydrocarbons is polymerized to higher boiling compounds, flashing the naphtha and fractionating the flashed vapors to produce a partly treated vapor fraction of a definite boiling range, passing this fraction into a treating and rectifying apparatus wherein the vapors are simultaneously fractionated and contacted with a countercurrent flowing suspension of an acid treated adsorbent decolorizing earth in a liquid hydrocarbon, maintaining the temperature sufficiently high to maintain in vapor form the hydrocarbons desired in the final product, withdrawing the treated fractionated hydrocarbon vapors and condensing them to yield a color stable motor fuel while simultaneously withdrawing unvaporized higher boiling hydrocarbons and partly spent adsorbent material, separating excess higher boiling hydrocarbons from the adsorbent material and passing the latter to the first step of the process.

3. The process of producing a color and gum stable motor fuel from a cracked naphtha distillate, which comprises subjecting the naphtha to contact with a partly spent solid adsorbent catalytic material at a temperature above the normal vaporizing temperature of the naphtha but below an active cracking temperature and under a superatmospheric pressure sufficient to prevent substantial vaporization of the naphtha, to effect a polymerization of undesirable unsaturated constituents of said naphtha to compounds of higher boiling point, flashing the treated naphtha to a lower pressure, fractionating the treated vapors to remove therefrom higher boiling hydrocarbons, subjecting the fractionated naphtha vapors to contact with relatively fresh solid catalytic adsorbent material while essentially in the vapor phase to effect a further polymerization of undesirable, unsaturated constituents, separating the treated vapors from the resultant higher boiling polymers, condensing the treated vapors and collecting them as a condensed treated liquid, withdrawing unvaporized oil and adsorbent from the fractionating stage, separating excess oil from the adsorbent material, subsequently employing the adsorbent material in the first step of the process, and employing the excess oil for introducing adsorbent material into the vapor-phase treating stage.

4. The process of producing a color and gum stable motor fuel from a cracked naphtha distillate, which comprises subjecting the naphtha to contact with a partly spent solid adsorbent catalytic material at a temperature of from 400° to 700° F. and under a pressure of at least 1000 pounds per square inch to effect a polymerization of undesirable unsaturated constituents of said naphtha to compounds of higher boiling point, flashing the treated naphtha to a lower pressure, fractionating the treated vapors to remove therefrom higher boiling hydrocarbons, subjecting the remaining naphtha vapors to contact with relatively fresh solid catalytic adsorbent material while essentially in the vapor phase to effect a further polymerization of undesirable, unsaturated constituents, separating the treated vapors from the resultant higher boiling polymers, condensing the treated vapors and collecting them as a condensed treated liquid, and subsequently employing the adsorbent material from the low pressure treating stage in the high-pressure treating stage.

5. The process of producing a color and gum stable motor fuel from a cracked naphtha distillate, which comprises heating the naphtha to an elevated temperature above the normal vaporizing temperature of the naphtha but below an active cracking temperature in the presence of partly spent solid catalytic adsorbent material and under high superatmospheric pressure to effect a polymerization of undesirable unsaturated constituents of said naphtha to polymers of higher boiling point, flashing the treated naphtha to a lower pressure to separate vapors of the desired treated naphtha from polymers that may be contained therein, passing the resultant vapors in countercurrent to a suspension of solid catalytic adsorbent material in hydrocarbon oil and simultaneously rectifying the vapors, withdrawing the treated vapors, condensing them and collecting them as a condensed treated liquid, separately collecting oil unvaporized in the rectifying operation together with partly spent catalytic adsorbent material, separating excess unvaporized oil from the adsorbent, and returning said partly spent catalytic adsorbent material to the first step of the process.

CHARLES F. TEICHMANN.